United States Patent [19]

Michel et al.

[11] Patent Number: 5,760,959

[45] Date of Patent: Jun. 2, 1998

[54] INTERFERENTIAL POSITION MEASURING DEVICE WITH THREE DETECTORS

[75] Inventors: Dieter Michel; Walter Huber, both of Traunstein, Germany

[73] Assignee: Dr. Johannes Heidenhain GmbH, Traunreut, Germany

[21] Appl. No.: 662,352

[22] Filed: Jun. 12, 1996

Related U.S. Application Data

[63] Continuation of Ser. No. 91,667, Jul. 14, 1993, abandoned.

[30] Foreign Application Priority Data

Jul. 18, 1992 [EP] European Pat. Off. ............ 92112302

[51] Int. Cl.⁶ ........................................... G01B 11/02
[52] U.S. Cl. ..................... 359/566; 356/356; 250/237 G
[58] Field of Search ........................ 356/356; 250/237 G, 250/550; 359/566

[56] References Cited

U.S. PATENT DOCUMENTS

| | | | |
|---|---|---|---|
| 3,427,463 | 2/1969 | Weyrauch | 250/237 R |
| 3,756,723 | 9/1973 | Hock | 356/400 |
| 4,155,647 | 5/1979 | Michel | 356/28 |
| 4,243,325 | 1/1981 | Ernst | 356/372 |
| 4,519,709 | 5/1985 | Nelle | 356/373 |
| 4,636,076 | 1/1987 | Pettigrew | 356/356 |
| 4,677,293 | 6/1987 | Michel | 250/237 G |
| 4,766,310 | 8/1988 | Michel | 250/237 G |
| 4,776,701 | 10/1988 | Pettigrew | 356/356 |
| 4,778,273 | 10/1988 | Michel | 356/374 |
| 4,843,237 | 6/1989 | Michel | 250/237 G |
| 5,064,290 | 11/1991 | McMurtry et al. | 250/237 G |
| 5,120,132 | 6/1992 | Spies et al. | 356/356 |
| 5,161,059 | 11/1992 | Swanson et al. | 359/565 |
| 5,182,610 | 1/1993 | Shibata | 356/349 |
| 5,214,280 | 5/1993 | Rieder et al. | 250/237 G |
| 5,264,914 | 11/1993 | Huber et al. | 356/356 |

FOREIGN PATENT DOCUMENTS

| | | | |
|---|---|---|---|
| 0 163 362 | 12/1985 | European Pat. Off. | G01D 5/38 |
| 2 075 408 | 10/1971 | France | G01B 11/00 |

Primary Examiner—Paul M. Dzierzynski
Assistant Examiner—John Juba, Jr.
Attorney, Agent, or Firm—Brinks Hofer Gilson & Lione

[57] ABSTRACT

An optical device, such as a position measuring instrument, having a source of light and a diffraction element for receiving the light, creating partial light beams which interfere with one another, and producing from the interfering partial light beams a first beam of light projecting along a first direction and producing a second beam of light projecting along a second direction. The optical device further includes a first optical projecting element positioned to receive the first beam of light and producing a first focused beam of light and a second optical projecting element positioned to receive the second beam of light and producing a second focused beam of light. Furthermore, the optical device has a first photodetector to receive and detect the first focused beam of light and a second photodetector to receive and detect the second focused beam of light.

5 Claims, 1 Drawing Sheet

INTERFERENTIAL POSITION MEASURING DEVICE WITH THREE DETECTORS

This application is a continuation of application Ser. No. 08/091,667 filed Jul. 14, 1993, now abandoned.

Applicants claim, under 35 U.S.C. § 119, the benefit of priority of the filing date of Jul. 18, 1992 of a European patent application, copy attached, Serial Number 92112302.2, filed on the aforementioned date, the entire contents of which are incorporated herein by reference.

FIELD OF THE INVENTION

The invention relates to an optical device in which changes in intensity of at least two beams, inclined in various directions as a result of diffraction at gratings, are detected by photodetectors.

In particular, the device relates to an interferential position measuring instrument with a highresolution triple grating system, in which relatively large diffraction angles occur.

BACKGROUND OF THE INVENTION

A triple grating measuring system is known from European Patent Application 0 163 362. This reference states that the photodetectors are disposed in the focal plane of a lens. However, disposing the photodetectors in one plane has the disadvantage of requiring relatively large-area photodetectors, in order to concentrate the entire intensity of the various beams onto the photodetectors.

In measuring systems having pitch periods on the order of magnitude of $\leq 2$ µm, the diffraction angles of the positive or negative first order are greater than 26°, so that projecting the diffracted beam is no longer possible, or at least is unfavorable, when there is only a single lens in only one plane.

It is an object of the present invention, by comparison, to create an optical device in which the beam detected by an optical projection system can be defined and completely detected with small-area and hence high-speed photodetectors, and so that scattered light effects are minimized.

SUMMARY OF THE INVENTION

The above-mentioned object is attained by an optical device comprising a source of light and a diffraction element for receiving the light, creating partial light beams which interfere with one another, and producing from the interfering partial light beams a first beam of light projecting along a first direction and producing a second beam of light projecting along a second direction. The optical device further includes a first optical projecting element positioned to receive the first beam of light and producing a first focused beam of light and a second optical projecting element positioned to receive the second beam of light and producing a second focused beam of light. Furthermore, the optical device comprises a first photodetector to receive and detect the first focused beam of light and a second photodetector to receive and detect the second focused beam of light.

The particular advantages of the present invention are that small-area and hence very high-speed photodetectors can be used, since the association of the photodetectors with the beams and the selection of optical systems are made individually and can therefore be optimized.

Moreover, all the beams are detected by the photodetectors, which guarantees high intensity of the signals derived from the photodetectors. The invention assures that the peripheral rays of the beam also arrive in their entirety at the photodetectors, and hence the scanning region of the scale grating is projected completely and uniformly onto the photodetectors.

The invention is described below in terms of exemplary embodiments, taken in conjunction with the drawings.

DESCRIPTION OF THE PREFERRED EMBODIMENTS

Figure 1:
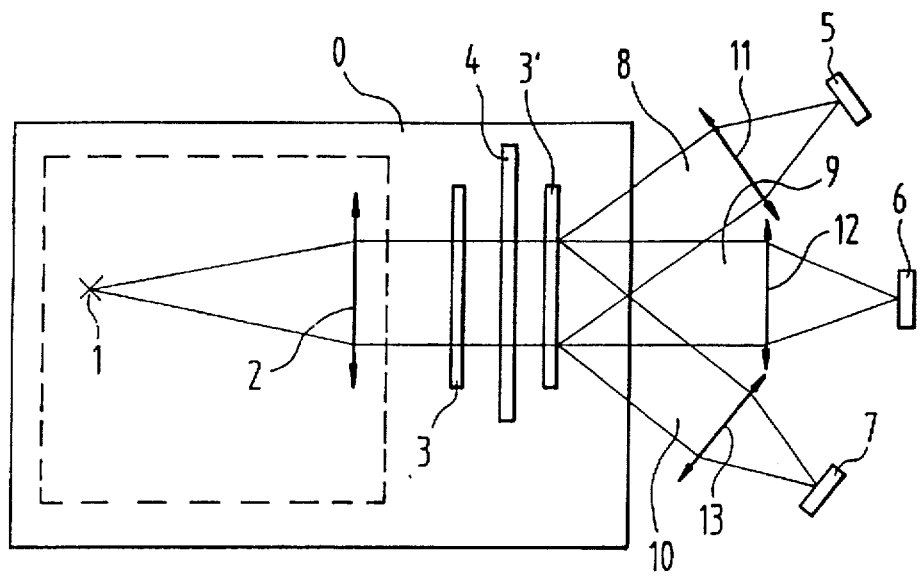
FIG. 1 schematically shows the layout and beam path in a length measuring instrument with a first embodiment of an optical projection system according to the present invention.

The photoelectric length measuring instrument 0 shown in FIG. 1 includes a source of light 1, a lens 2, a scanning plate 3, 3' with a grating, not shown, a scale grating 4, and three photodetectors 5, 6 and 7.

The beam course will be described only briefly, because it is explained in detail in European Patent Application 0 163 362 B1. Accordingly, the light generated by the source of light 1 and collimated by the lens 2 is received by a diffraction element having one or more gratings. In FIG. 1, the collimated light is diffracted to generate a first set of diffracted partial light beams primarily in three different directions on passing through the grating of the scanning plate 3. The diffracted partial beams of the 0 order and both +1 and −1 orders are not shown here, because they contribute nothing to comprehension of the invention.

At the scale grating 4, the partial beams are diffracted once more. This creates a second set of diffracted partial light beams which have been diffracted once again, which pass through the grating belonging to the scanning plate 3, 3'. The grating of the second scanning plate 3' causes the second set of diffracted partial light beams to interfere with one another and then generates from the interfering partial light beams additional diffracted partial beams of light 8, 9 and 10 that are projected at different directions having different inclinations with respect to each other.

An optical projecting element is located in the beam path of each individual beam 8, 9, 10 and is optimized for that associated beam path. In this case, these elements are three refractive elements, such as lenses 11, 12 and 13, each of which receives and focuses the associated beam 8, 9 and 10 so as to direct respective focused beams of light onto the associated photodetector 5, 6 and 7. In this case, each beam of light arrives parallel to an optical axis of each optical projecting element.

Figure 2:
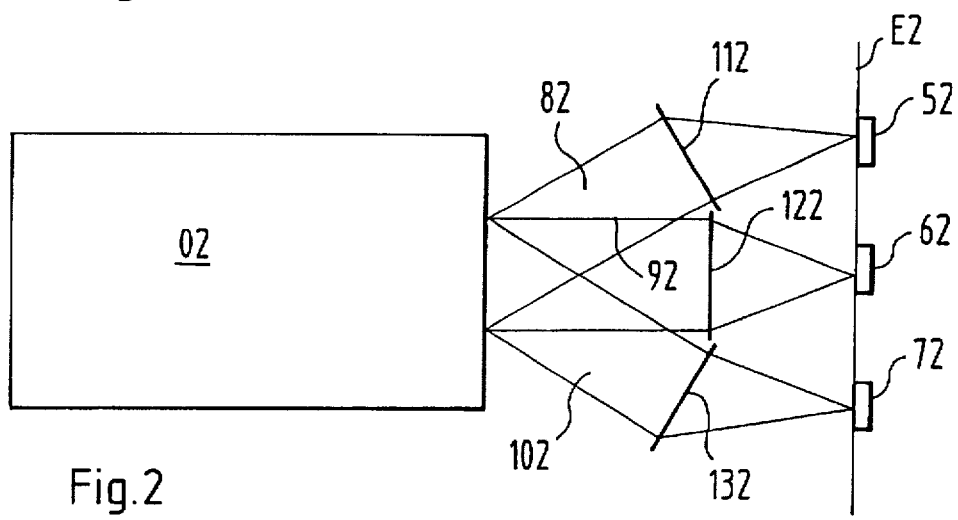
FIG. 2 shows an exemplary embodiment of a length measuring instrument with a second embodiment of an optical projection system according to the present invention.
Figure 3:
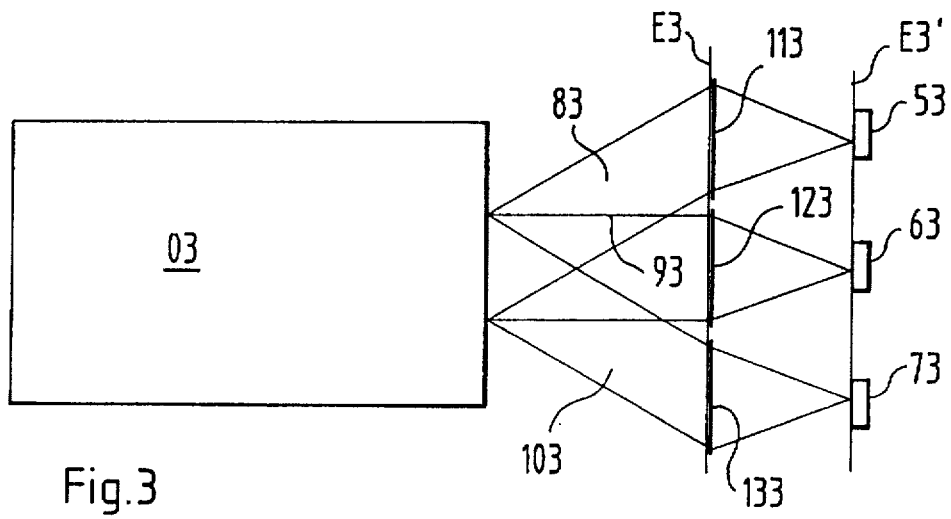
FIG. 3 shows another embodiment of a length measuring instrument with a third embodiment of an optical-projection system according to the present invention.

Note that the properties of the optical projecting elements and the location of the associated photodetectors of the present invention and as illustrated in FIGS. 1–3 can be optimally adapted to one another, since an optical projecting element need be designed for only one beam. For example, each projecting optical element may comprise one or more optical components, such as refractive optical elements, reflective optical elements, or diffractive optical elements. Furthermore, it is possible that the projecting optical elements are each a reflective optical element, or each a refractive optical element, or some of the projecting optical elements are reflective and the other projecting optical elements are refractive.

FIG. 2 schematically shows a diffraction element comprising a triple grating measuring array 02 which is illuminated by either collimated or uncollimated light, in which the spatially separated beams 82, 92 and 102 are focused onto the associated photodetectors 52, 62, 72 wherein the projecting optical elements are diffractive optical elements (or DOEs) 112, 122, 132. Given a suitable selection of these elements 112, 122, 132, the beams may arrive at arbitrary angles, while the associated photodetectors, however, are located in one plane E2, which has advantages in terms of manufacture.

As FIG. 3 shows, in an optical device 03 of the type referred to at the outset, because it is possible to select the optical elements 113, 123, 133, it is also possible to select how they are arranged, so that not only the optical elements 113, 123, 133 but also the associated photodetectors 53, 63, 73 are disposed in planes E3, E3' that extend parallel to one another. Note that optical device 03 may comprise a triple grating measuring array which is illuminated by either collimated or uncollimated light as in FIG. 2.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A position measuring device, comprising:

a source of light;

a scanning plate comprising a grating for receiving said light and generating a first set of diffracted partial light beams;

a scale grating for receiving said first set of diffracted partial light beams and generating a second set of diffracted partial light beams;

a second scanning plate comprising a grating for receiving said second set of diffracted partial light beams, wherein said grating of said second scanning plate (1) causes said second set of diffracted partial light beams to interfere with one another, and (2) generates from the interfering partial light beams a first beam of light projecting along a first direction and producing a second beam of light projecting along a second direction and producing a third beam of light projecting along a third direction, said three directions having different inclinations from one another;

a first optical projecting element positioned to receive said first beam of light and producing a first focused beam of light;

a second optical projecting element positioned to receive said second beam of light and producing a second focused beam of light;

a third optical projecting element positioned to receive said third beam of light and producing a third focused beam of light;

a first photodetector to receive and detect said first focused beam of light;

a second photodetector to receive and detect said second focused beam of light; and a third photodetector to receive and detect said third focused beam of light, said first, second, and third photodetectors being disposed along a straight line within a detector plane that intersects said first, second and third photodetectors, wherein said first and second optical projecting elements comprise an optical structure so as to direct said first and second focused beams of light towards said first and second photodetectors, respectively, so that said first and second focused beams of light are focused onto said detector plane and the optical axes of said first and second beams of light projecting along said first and second directions are parallel to the optical axes of said first and second optical projecting elements, respectively.

2. The position measuring device of claim 1 wherein said first optical projecting element comprises a refractive optical element.

3. The position measuring device of claim 1 wherein said first optical projecting element comprises a reflective optical element.

4. The position measuring device of claim 1 wherein said first optical projecting element comprises a diffractive optical element.

5. The position measuring device of claim 1, wherein said first and second optical projecting elements form a reflective optical element.

* * * * *

UNITED STATES PATENT AND TRADEMARK OFFICE
CERTIFICATE OF CORRECTION

PATENT NO. : 5,760,959
DATED : June 2, 1998
INVENTOR(S) : Dieter Michel et al.

It is certified that error appears in the above-indentified patent and that said Letters Patent is hereby corrected as shown below:

In column 2, line 9, change "5,264,914" to --5,264,915--.

Signed and Sealed this

Eighth Day of August, 2000

Attest:

Q. TODD DICKINSON

*Attesting Officer*   *Director of Patents and Trademarks*